United States Patent
Suzuki et al.

(10) Patent No.: US 10,200,296 B2
(45) Date of Patent: Feb. 5, 2019

(54) PACKET TRANSPORT APPARATUS, PACKET TRANSPORT SYSTEM AND PACKET TRANSPORT METHOD

(71) Applicant: NEC Corporation, Tokyo (JP)

(72) Inventors: Jun Suzuki, Tokyo (JP); Yuki Hayashi, Tokyo (JP); Masaki Kan, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 101 days.

(21) Appl. No.: 15/309,297

(22) PCT Filed: May 7, 2015

(86) PCT No.: PCT/JP2015/002319
§ 371 (c)(1),
(2) Date: Nov. 7, 2016

(87) PCT Pub. No.: WO2015/170474
PCT Pub. Date: Nov. 12, 2015

(65) Prior Publication Data
US 2017/0078212 A1    Mar. 16, 2017

(30) Foreign Application Priority Data

May 9, 2014    (JP) .................................. 2014-097918

(51) Int. Cl.
*H04L 12/875* (2013.01)
*H04L 12/879* (2013.01)
(Continued)

(52) U.S. Cl.
CPC ............ *H04L 47/56* (2013.01); *H04L 47/522* (2013.01); *H04L 49/901* (2013.01); *H04L 47/621* (2013.01); *H04L 47/6225* (2013.01)

(58) Field of Classification Search
CPC ..... H04L 47/522; H04L 47/56; H04L 47/621; H04L 47/6225; H04L 49/901
See application file for complete search history.

(56) References Cited

U.S. PATENT DOCUMENTS

| | | |
|---|---|---|
| 2004/0264454 A1 | 12/2004 | Rajkumar et al. |
| 2011/0019557 A1* | 1/2011 | Hassan .................. H04L 47/10 370/252 |

(Continued)

FOREIGN PATENT DOCUMENTS

| | | | |
|---|---|---|---|
| JP | 2006-067566 A | 3/2006 | |
| JP | 2006-526369 A | 11/2006 | |

(Continued)

OTHER PUBLICATIONS

Kyungtae Kim et al., "On Packet Aggregation Mechanisms for Improving VoIP Quality in Mesh Networks," IEEE 63rd Vehicular Technology Conference, May 7-10, 2006, pp. 891-895.

(Continued)

*Primary Examiner* — Benjamin H Elliott, IV
(74) *Attorney, Agent, or Firm* — Sughrue Mion, PLLC

(57) ABSTRACT

[Problem] In a case where a plurality of packets are compiled for transmission to a network, the length of data to be continuously transmitted to each of a plurality of destinations is increased and hence the time interval in which the packet(s) addressed to each destination gets a transmission opportunity is increased, with the result that the packet delay is disadvantageously increased. [Solution] A packet extraction unit (22 of FIG. 2) extracts a plurality of packets as a whole from a packet compilation queue (21 of FIG. 2) that sorts, according to destinations, and stores packets. A limited number of packets to be extracted as a whole at this time is given in accordance with a maximum packet compilation number defined by a maximum compilation number calcu- (Continued)

lation unit (29 of FIG. 2) on the basis of a band increase and a delay increase due to a packet compilation.

9 Claims, 16 Drawing Sheets

(51) Int. Cl.
*H04L 12/873* (2013.01)
*H04L 12/863* (2013.01)

(56) References Cited

U.S. PATENT DOCUMENTS

| | | |
|---|---|---|
| 2013/0003557 A1 | 1/2013 | Vulkan et al. |
| 2013/0343182 A1 | 12/2013 | Hassan et al. |
| 2015/0163153 A1* | 6/2015 | Hassan .................. H04L 47/10 370/235 |
| 2017/0078212 A1* | 3/2017 | Suzuki .................. H04L 47/522 |

FOREIGN PATENT DOCUMENTS

| | | |
|---|---|---|
| JP | 2008-118257 A | 5/2008 |
| WO | 2012/032606 A1 | 3/2012 |

OTHER PUBLICATIONS

Written Opinion of the International Searching Authority of PCT/JP2015/002319 dated Jun. 30, 2015.
International Search Report of PCT/JP2015/002319 dated Jun. 30, 2015.

* cited by examiner

Fig. 6

| PACKET DESTINATION ADDRESS | ENCAPSULATED ADDRESS |
|---|---|
| AAAA_AAAA | xxxx_xxxx |
| BBBB_BBBB | yyyy_yyyy |
| ... | ... |

ENCAPSULATION TABLE 25

PACKET TRANSPORT APPARATUS, PACKET TRANSPORT SYSTEM AND PACKET TRANSPORT METHOD

CROSS REFERENCE TO RELATED APPLICATIONS

This application is a National Stage of International Application No. PCT/JP2015/002319 filed May 7, 2015, claiming priority based on Japanese Patent Application No. 2014-097918 filed May 9, 2014, the contents of all of which are incorporated herein by reference in their entirety.

TECHNICAL FIELD

The present invention relates to a packet transmission apparatus, a packet transmission system, and a packet transmission method, and more particularly, to a packet transmission apparatus, a packet transmission system, and a packet transmission method that enable to transmit packets with a low delay and in broadband.

BACKGROUND ART

NPL 1 describes an example of a conventional packet transmission system. A conventional packet transmission system illustrated in FIG. 15 is constituted by a network node 7-A, a network node 7-B, a network node 7-C, and a network 3 which connects these network nodes. In this example, for convenience of explanation, the number of network nodes is three. The number of network nodes, however, is not limited to the above. Further, the network node 7-A, the network node 7-B, and the network node 7-C communicate with one another via the network 3.

Next, a configuration of the network node 7-A is described using FIG. 15. The other configurations of the network node 7-B and the network node 7-C are the same as the configuration of the network node 7-A. The network node 7-A includes a packet output application 71, a packet aggregation que 72, a packet aggregation unit 73, a memory 74, and a packet receiving unit 75. The packet output application 71 outputs a packet. The packet aggregation que 72 stores a packet to be transmitted to the network 3. The packet aggregation unit 73 aggregates a plurality of packets stored in the packet aggregation que 72 for transmission to the network 3. The memory 74 holds an operation parameter of the packet aggregation unit 73. The packet receiving unit 75 receives a packet from the network 3, and transfers the received packet to the packet output application 71. The packet aggregation unit 73 includes a timer 731 which detects a timeout that gives a trigger for use in transmitting aggregated packets. The memory 74 holds a minimum aggregation number 741 indicating a minimum value of the number of packets aggregated, and a timeout value 742 indicating a timeout value of packet aggregation. Further, a packet 721 is a leading packet of the packet aggregation que 72, and packets 722 are packets whose destinations are the same as the destination of the packet 721.

An operation of the conventional packet transmission system having the aforementioned configuration is described using FIG. 16. In this example, an operation for transmitting packets to the network 3 by the packet output application 71 held in the network node 7-A is described.

Packets output by the packet output application 71 are stored in the packet aggregation que 72. The packet aggregation unit 73 refers to the packet aggregation que 72 and generates, when the packet 721 (indicated by a packet P in FIG. 16) exists at the leading position of the que, at the same time, when the number of the packets 722 (indicated by packets P' in FIG. 16), whose destinations are the same as the packet 721 stored in the packet aggregation que 72, is larger than the minimum aggregation number 741 (Step F101), a packet aggregating the packet 721 and the packets 722 (Step F102). In this example, the number of the packets 722 (packets P') to be aggregated into an aggregated packet is equal to the whole number of the packets 722, or is equal to a maximum value of the aggregation number to be allowed by a maximum packet length.

Next, the packet aggregation unit 73 refers to the packet aggregation que 72 and generates, when the packet 721 exists at the leading position of the que, and when the timer 731 set to the timeout value 742 times out (Step F103), a packet aggregating the packet 721 and the packets 722 (Step F104).

In this example, the number of the packets 422 to be aggregated into an aggregated packet is equal to the number of packets aggregated in Step F102.

Next, when an aggregated packet is generated in Step F102 or in Step F104, the packet aggregation unit 73 transmits the generated packet to the network 3 (Step F105). Next, the packet aggregation unit 73 resets the timeout value of the timer 731 to a value determined by the timeout value 742 (Step F106). Next, the conventional packet transmission system continuously transmits packets output by the packet output application 71 to the network 3 by returning to the operation of Step F101.

By performing the aforementioned operation, the conventional packet transmission system aggregates a plurality of packets for transmission to a network to implement broadband packet transmission. As an example, when the network 3 is a network in conformity with a wireless LAN (Local Area Network) protocol, a time interval at which packets are sequentially transmitted is determined by the network protocol. As a result of the determination, a band in which the packet output application 71 can transmit packets to the network 3 is limited. However, aggregating a plurality of packets for transmission makes it possible to reduce a time interval associated with a span between aggregated packets. This makes it possible to implement broadband packet communication.

CITATION LIST

Patent Literature

[PTL 1] International Publication No. WO2012/032606
[PTL 2] Published Japanese Translation of PCT International Publication No. 2006-526369
[PTL 3] Japanese Unexamined Patent Application Publication No. 2006-067566

Non Patent Literature

[NPL 1] K. Kim, S. Ganguly, R. Izmailov, S. Hong "On Packet Aggregation Mechanisms for Improving VoIP Quality in Mesh Networks" IEEE 63rd Vehicular Technology Conference, May 7 to 10, 2006, pp. 891-895

SUMMARY OF INVENTION

Technical Problem

In NPL 1 described above, however, there is a problem that a transmission delay may occur in packets when the packets are aggregated.

The reason for this is that, when a plurality of packets are aggregated for transmission to a network, a length of data to be sequentially transmitted to one destination increases, and a time interval for use in obtaining a transmission opportunity by a packet of each destination increases.

OBJECT OF INVENTION

An object of the present invention is to provide a packet transmission apparatus, a packet transmission system, and a packet transmission method in broadband while suppressing an increase in delay by packet aggregation.

Solution to Problem

According to the present invention, a packet transmission apparatus comprises:
storage means which sorts and stores packets in accordance with each destination;
extraction means which extracts a plurality of packets stored in the storage means for each destination by one-time operation; and
maximum packet number setting means which sets a maximum number of packets to be extracted by the extraction means by one-time operation, wherein
the maximum packet number setting means sets the maximum number of packets in such a manner that an integrated gain representing an increase in band by aggregation of extracted packets, and a transmission delay by the packet aggregation is equal to or larger than a predetermined value.

According to the present invention, a packet transmission system comprises:
bridge means which aggregates packets for transmission;
administration means which administrates the bridge means; and
a network which connects between the bridge means and the administration means,
the bridge means including:
storage means which sorts and stores packets in accordance with each destination;
extraction means which extracts a plurality of packets stored in the storage means for each destination by one-time operation;
address storage means which holds an address for use in encapsulating packets extracted by the extraction means; and
packet encapsulation means which retrieves an address for use in encapsulation from the address storage means, and aggregates and encapsulates a plurality of packets extracted by the extraction means, and
the administration means including:
maximum packet number calculation means which calculates a maximum number of packets to be extracted by the extraction means by one-time operation;
parameter input means which inputs a parameter for use in calculating a maximum number of packets by the maximum packet number calculation means; and
transmission means which transmits a maximum number of packets calculated by the maximum packet number calculation means, to the bridge means.

According to the present invention, a packet transmission method for use in a packet transmission apparatus comprises:
sorting and storing packets in accordance with each destination;
extracting a plurality of the stored packets for each destination by one-time operation;
performing the plural extraction, based on a maximum number of packets to be extracted by one-time operation; and
determining the maximum number of packets in such a manner that an integrated gain representing an increase in band by aggregation of extracted packets, and a transmission delay by the packet aggregation is equal to or larger than a predetermined value.

Advantageous Effects of Invention

According to the present invention, it is possible to implement broadband packet transmission while suppressing an increase in delay by packet aggregation.

BRIEF DESCRIPTION OF DRAWINGS

FIG. 6 is a diagram for describing the content of an encapsulation table.

DESCRIPTION OF EMBODIMENTS

Figure 2:
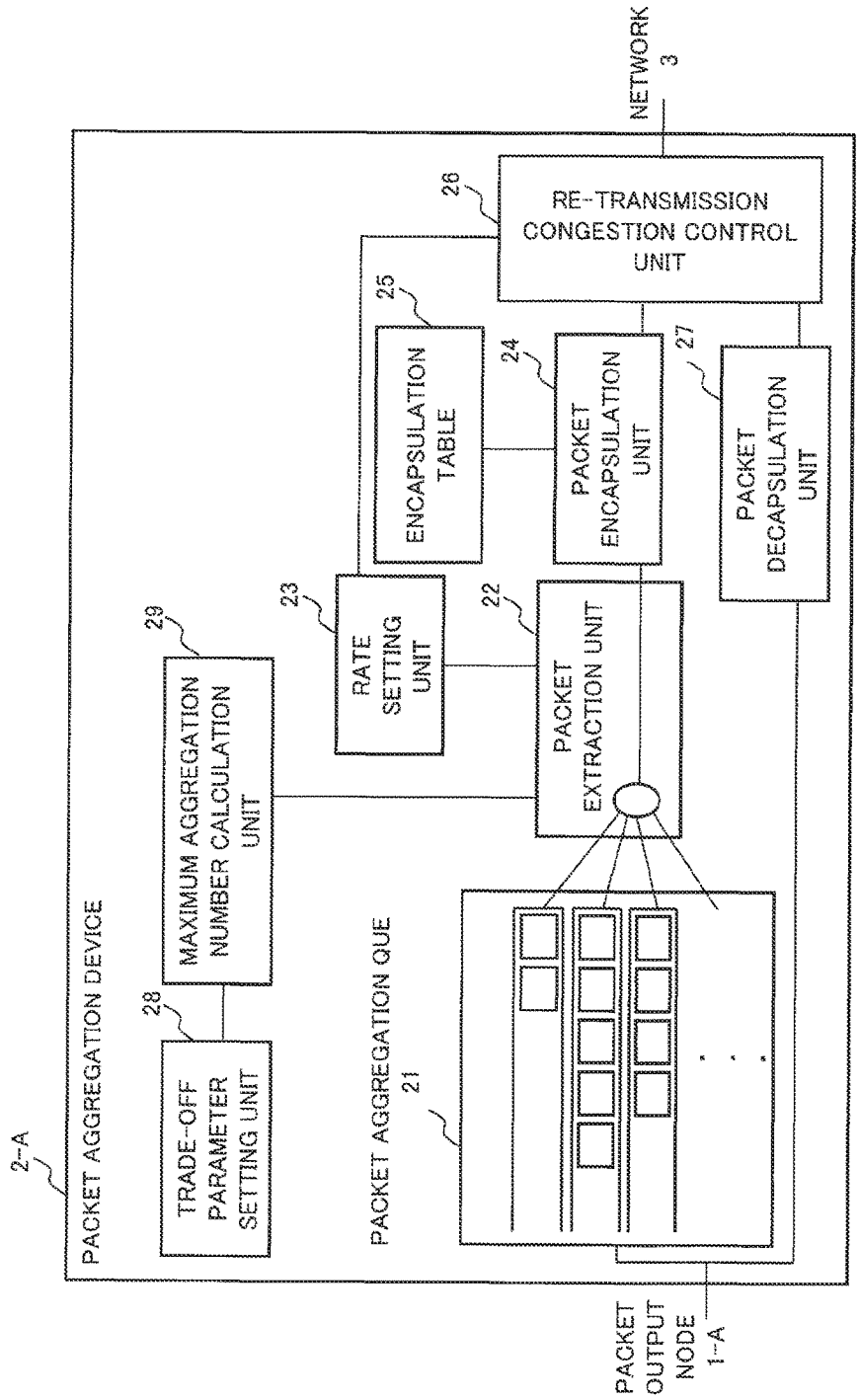
FIG. 2 is a block diagram illustrating a configuration of a packet transmission apparatus of the first exemplary embodiment of the present invention.

A packet transmission apparatus of an exemplary embodiment includes a buffer aggregation que (indicated by the reference sign 21 in FIG. 2, corresponding to a storage means), a packet extraction unit (indicated by the reference sign 22 in FIG. 2, corresponding to an extraction means), and a maximum aggregation number calculation unit (indicated by the reference sign 29 in FIG. 2, corresponding to a maximum packet number setting means). The buffer aggregation que 21 sorts and stores packets in an internal que for each destination. The packet extraction unit 22 searches the internal ques of the buffer aggregation que by a round robin method, and extracts a plurality of packets stored in the internal que in search and having a same destination. The maximum aggregation number calculation unit 29 performs a calculation for optimizing a trade-off relationship between an increase in a band and an increase in delay by packet aggregation, and sets a maximum number of packets to be extracted by the packet extraction unit by one-time processing. According to the aforementioned configuration, the packet transmission apparatus is operated to extract all the packets stored in the buffer aggregation que and having a same destination with use of a maximum aggregation number determined by the maximum aggregation number calculation unit as an upper limit, and to encapsulate one or more of the extracted packets into a packet for transmission to a network. The packet transmission apparatus of the exemplary embodiment employs the aforementioned configuration, in which the maximum number of packets to be aggregated by one-time processing is determined, and a plurality of packets are aggregated for transmission.

Next, a first exemplary embodiment for implementing the present invention is described in detail referring to the drawings.

Figure 1:
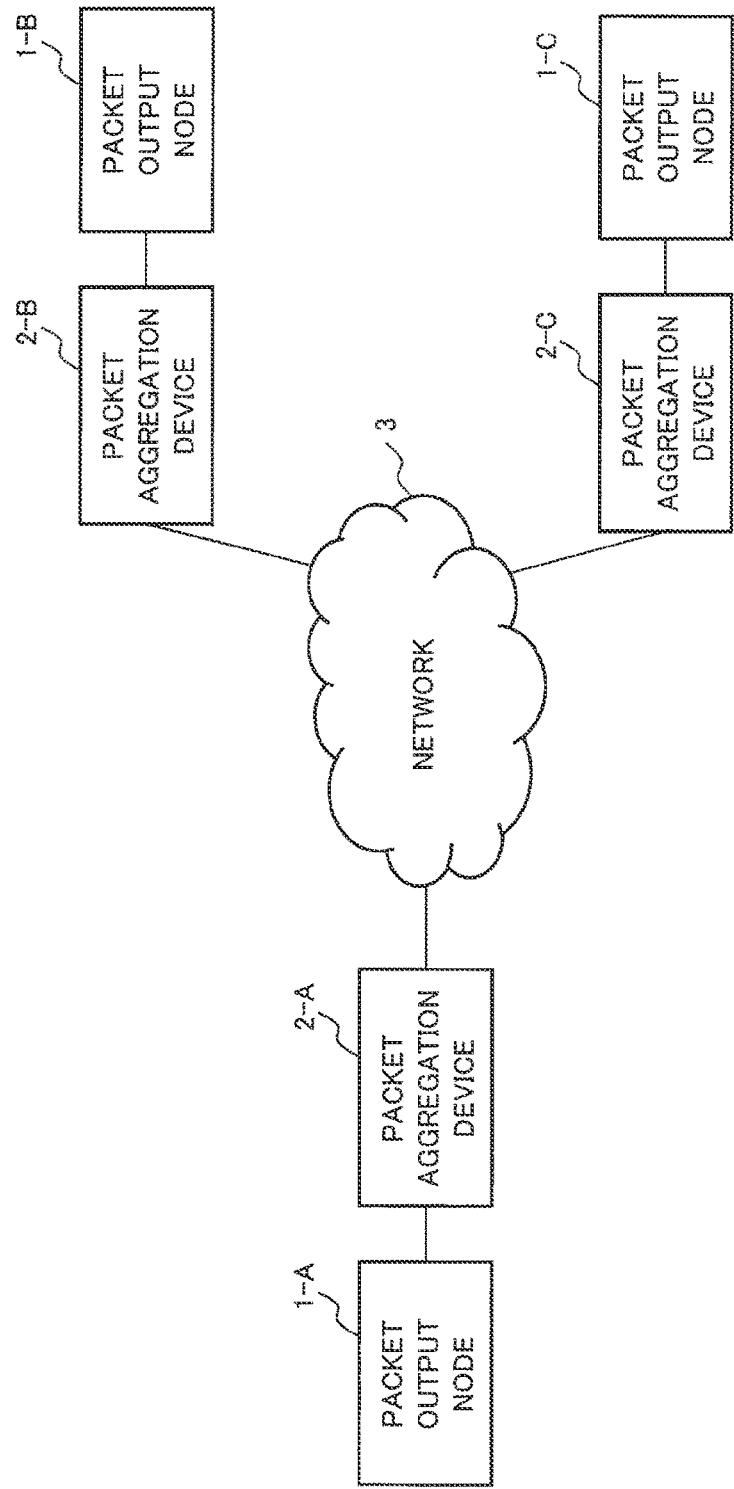
FIG. 1 is a block diagram illustrating a configuration of a packet transmission system of a first exemplary embodiment of the present invention.

Referring to FIG. 1, a packet transmission system of the first exemplary embodiment of the present invention includes a packet output node 1-A, a packet output node 1-B, and a packet output node 1-C which transmit and receive packets. Further, the packet transmission system of the first exemplary embodiment of the present invention includes a packet aggregation device 2-A, a packet aggregation device 2-B, and a packet aggregation device 2-C which aggregate a plurality of packets output from the packet output node 1-A, the packet output node 1-B, and the packet output node 1-C respectively for transmission to a network 3. Furthermore, the packet transmission system of the first exemplary embodiment of the present invention includes the network 3 which connects the packet aggregation device 2-A, the packet aggregation device 2-B, and the packet aggregation device 2-C to each other. The packet output node 1-A, the packet output node 1-B, and the packet output node 1-C communicate with each other via the network 3. Note that the configurations of the packet output node 1-A, the packet output node 1-B, and the packet output node 1-C are the same as each other. Further, the configurations of the packet aggregation device 2-A, the packet aggregation device 2-B, and the packet aggregation device 2-C are also the same as each other. Note that in the present description, there are three sets of packet output nodes and packet aggregation devices. In the present exemplary embodiment, however, the number of sets of packet output nodes and packet aggregation devices is not limited to the above. For instance, the number of sets of packet output nodes and packet aggregation devices may be one, two, or more than two.

Each of the packet aggregation device 2-A, the packet aggregation device 2-B, and the packet aggregation device 2-C serves as a packet transmission apparatus.

FIG. 2 is a block diagram illustrating an internal configuration of the packet aggregation device 2-A, which serves as a packet transmission apparatus of an exemplary embodiment of the present invention. Note that the configuration and the operation of the packet aggregation device 2-B, and the configuration and the operation of the packet aggregation device 2-C are the same as each other. Therefore, in the following, description is made only for the packet aggregation device 2-A.

Referring to FIG. 2, the packet aggregation device 2-A includes the packet aggregation que 21, the packet extraction unit 22, a rate setting unit 23, a packet encapsulation unit 24, an encapsulation table 25, a re-transmission congestion control unit 26, a packet decapsulation unit 27, the maximum aggregation number calculation unit 29, and a trade-off parameter setting unit 28. The packet aggregation que 21 sorts and stores packets output from the packet output node 1-A in a plurality of internal ques according to each destination. The packet extraction unit 22 extracts a plurality of packets stored in the packet aggregation que 21 and having a same destination. The rate setting unit 23 sets a speed at which packets are extracted by the packet extraction unit 22. The packet encapsulation unit 24 encapsulates a plurality of packets extracted by the packet extraction unit 22 into a single packet. The encapsulation table 25 holds destination address information to be written in the headers of packets to be encapsulated in encapsulating a plurality of packets by the packet encapsulation unit 24. The re-transmission congestion control unit 26 transmits a packet obtained by encapsulating a plurality of packets to the network 3 at a speed at which congestion does not occur in the network 3. The packet decapsulation unit 27 receives a packet obtained by encapsulating a plurality of packets from the re-transmission congestion control unit 26, and decapsulates the encapsulated packet into a plurality of original packets for transmission to the packet output node 1-A. The maximum aggregation number calculation unit 29 sets the maximum number of packets to be extracted by the packet extraction unit 22 by one-time processing. The trade-off parameter setting unit 28 gives a parameter for calculating the maximum packet number by the maximum aggregation number calculation unit 29.

The packet aggregation que 21 corresponds to a storage means which sorts and stores packets according to each destination. The maximum aggregation number calculation unit 29 corresponds to a maximum packet number setting means. The trade-off parameter setting unit corresponds to a parameter input means. The encapsulation table 25 corresponds to an address storage means. The packet encapsulation unit 24 corresponds to a packet encapsulation means.

Figure 3:
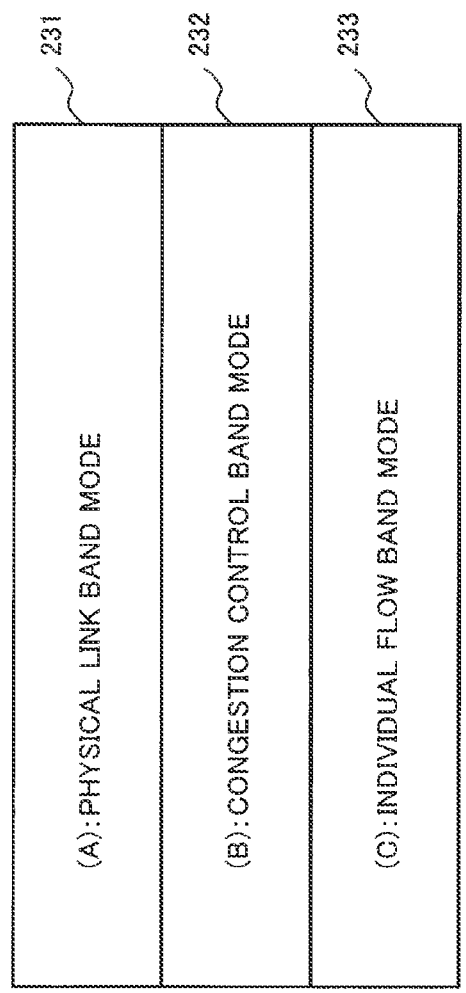
FIG. 3 is a diagram illustrating three modes of a rate setting unit.

The rate setting means 23 causes the packet extraction unit 22 to operate in one of the three modes illustrated in FIG. 3. In (A): a physical link band mode 231, the rate setting unit 23 sets the packet extraction unit 22 in such a manner that the packet extraction unit 22 extracts packets from the packet aggregation que 21 at a band speed in a network link by which the re-transmission congestion control unit 26 and the network 3 are connected, on the basis of a round robin method. In this case, the rate setting unit 23 notifies the packet extraction unit 22 of a band in the network link by which the re-transmission congestion control unit 26 and the network 3 are connected. In this example, the round robin method is also called a "cyclic parallel process". A process of extracting packets on the basis of a round robin method is a process of searching a plurality of internal ques in a buffer aggregation que in order, and extracting a plurality of packets having a same destination.

Further, in (B): a congestion control band mode 232, the rate setting unit 23 sets in such a manner that packets are extracted from the packet aggregation que 21 at a predetermined speed on the basis of a round robin method. Note that the predetermined speed is a smaller speed, out of a total value of packet transmission speeds set for the respective destinations by the re-transmission congestion control unit 26 by the packet extraction unit 22, and a band in a network link by which the re-transmission congestion control unit 26 and the network 3 are connected. In this example, the rate setting unit 23 notifies the packet extraction unit 22 of a total value of packet transmission speeds set for the respective destinations by the re-transmission congestion control unit 26, and a band in a network link by which the re-transmission congestion control unit 26 and the network 3 are connected. Further, in (C): an individual flow band mode 233, the rate setting unit 23 sets the packet extraction unit 22 in such a manner that the packet extraction unit 22 extracts packets of the respective destinations from the packet aggregation que 21 on the basis of a round robin method at the same speed as the speed at which the re-transmission congestion control unit 26 transmits packets to the packet destinations. In this example, the rate setting unit 23 notifies the packet extraction unit 22 of a speed at which the re-transmission congestion control unit 26 transmits a packet to each of the destinations to be connected via the network 3.

The packet aggregation que 21 sorts and stores packets output from the packet output node 1-A according to each destination. In view of the above, the packet aggregation que 21 holds internal ques by the number equal to the number of destination nodes. The packet aggregation que 21 sorts packets output from the packet output node 1-A in the receiving order for each destination, and stores the sorted packets in ques that are sorted according to each destination node.

Figure 4:
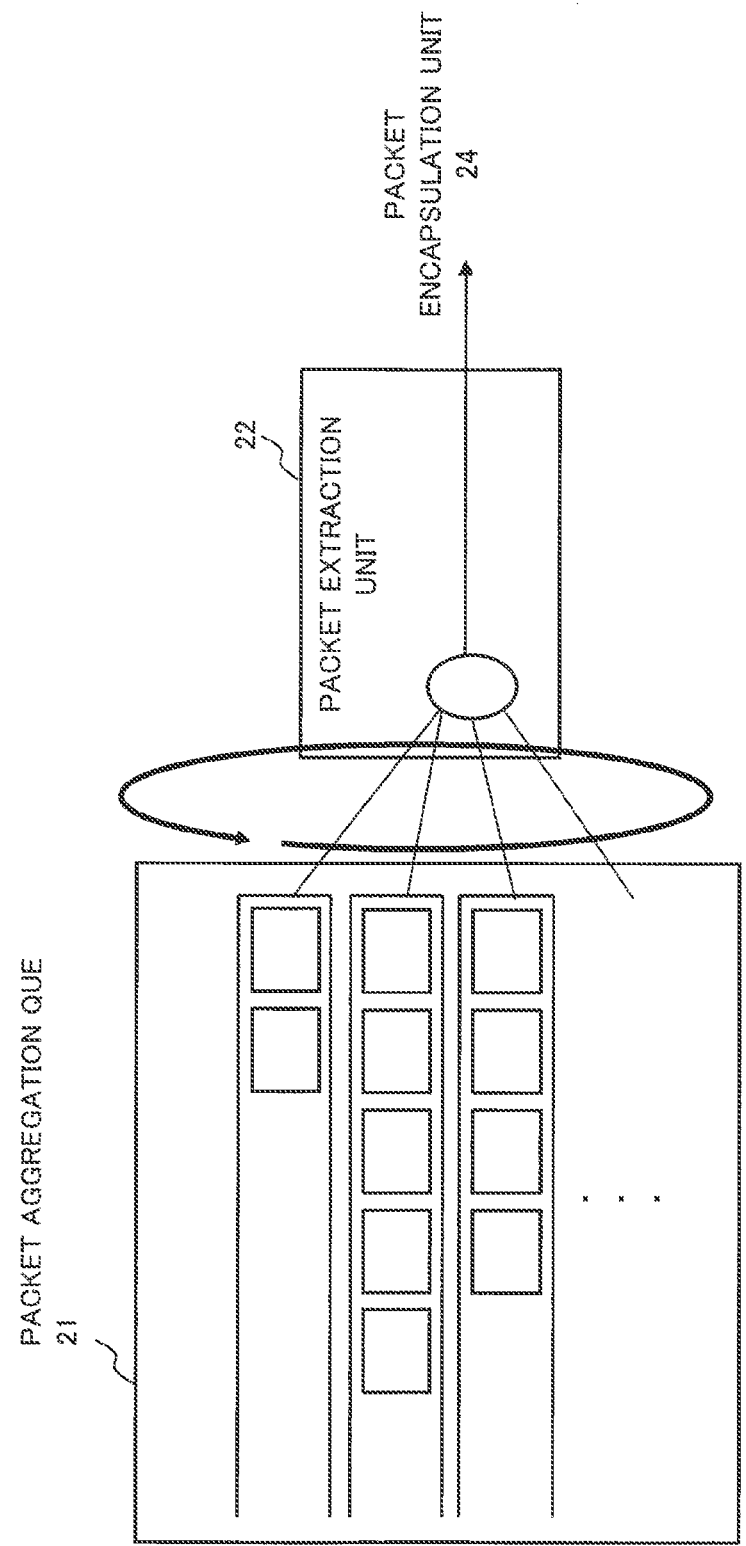
FIG. 4 is a diagram for describing the first exemplary embodiment of the present invention.

The packet extraction unit 22 is operated in one of the three modes set by the rate setting unit 23. In (A): the physical link band mode 231 and in (B): the congestion control band mode 232, the packet extraction unit 22 extracts packets from the packet aggregation que 21 at a speed (data volume/unit time), which is designated from the rate setting unit 23, on the basis of a round robin method. As illustrated in FIG. 4, in packet extraction on the basis of round robin, the packet extraction unit 22 searches internal ques to be held in the packet aggregation que 21 for each destination in order. In this case, when packets of a same destination are stored in an internal que in search, the packet extraction unit 22 extracts all the stored packets, and transfers the extracted packets to the packet encapsulation unit 24. Note that the upper limit of the number of packets to be extracted from an internal que of the packet aggregation que 21 is a smaller one, out of the value set by the maximum aggregation number calculation unit 29, and the maximum number such that the total size of packets to be extracted does not exceed the upper limit of the packet size determined in the network 3. In this example, the upper limit of the packet number to be designated by the maximum aggregation number calculation unit 29 may be expressed by the number of packets, or may be expressed by the total size of packets that are aggregated.

Figure 5:
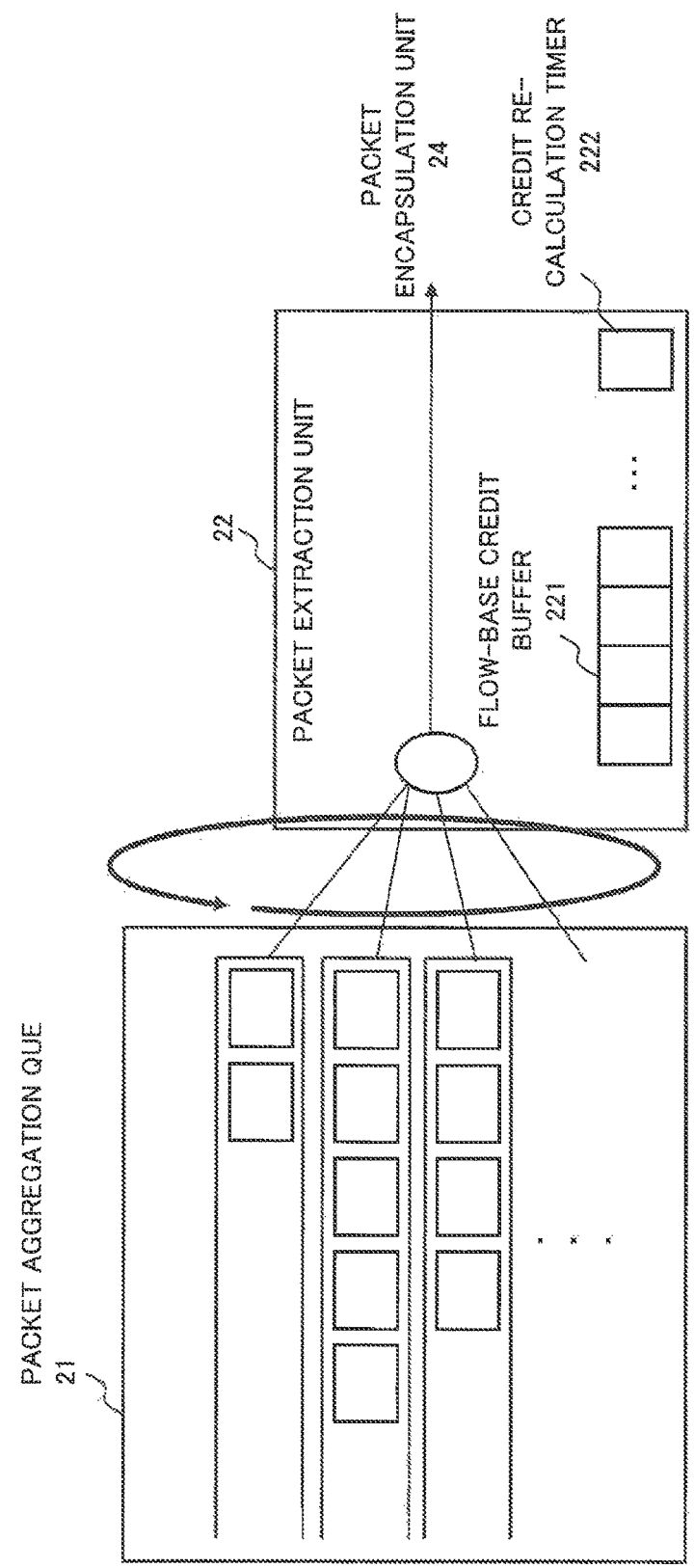
FIG. 5 is a diagram for describing the first exemplary embodiment of the present invention.

Further, in (C): the individual flow band mode 233, the packet extraction unit 22 extracts packets of the respective destinations from the packet aggregation que 21 at a transmission speed to the network 3, which is set by the re-transmission congestion control unit 26 for each destination. As illustrated in FIG. 5, the packet extraction unit 22 internally holds a flow-based credit buffer 221 and a credit re-calculation timer 222 for an operation in (C): the individual flow band mode 233. The flow-base credit buffer 221 holds elements for each destination, with which the packet output node 1-A performs communication. A credit associated with a transmission speed, which is notified from the rate setting unit 23 to the packet extraction unit 22 for each destination, is accumulated in the flow-base credit buffer 221 as time elapses. In this example, a credit is a right for transmitting a unit data length.

The credit re-calculation timer 222 is a timer for administrating a period during which a credit is accumulated in the flow-base credit buffer 221. The packet extraction unit 22 cyclically searches an internal que of the packet aggregation que 21 by a round robin method. In this case, when the credit accumulated in the credit buffer 221 is equal to or larger than the total size of packets stored in an internal que, the packet extraction unit 22 extracts all the stored packets from the internal que, and transfers the extracted packets to the packet encapsulation unit 24 by referring to the flow-base credit buffer 221, which corresponds to a destination associated with the internal que. Further, the packet extraction unit 22 subtracts the value of the credit associated with the total size of packets extracted from an internal que of the packet aggregation que 21, from the element associated with the packet destination of the flow-base credit buffer 221. Note that when the number of stored packets exceeds a smaller value, out of the value set by the maximum aggregation calculation unit 29, and the upper limit of the packet size determined in the network 3, the smaller value serves as the upper limit of the number of packets to be extracted by one-time processing. Therefore, when the credit accumulated in the credit buffer 221 is equal to or larger than the upper limit of the packet number, the packet extraction unit 22 extracts packets of the number corresponding to the upper limit, which are stored, from an internal que. Further, the packet extraction unit 22 subtracts the value of the credit associated with the total size of packets of the upper limit, which are extracted from an internal que of the packet aggregation que 21, from the element associated with the packet destination of the flow-base credit buffer 221.

The encapsulation table 25 holds address information to be written in the headers of packets to be encapsulated in encapsulating packets transmitted from the packet output node 1-A. As illustrated in FIG. 6, the encapsulation table 25 is such that destination addresses of packets to be encapsulated are associated with destination addresses of packets transmitted from the packet output node 1-A. In this case, a packet destination address may be a single value, or may be a specific address region, as exemplified by a destination memory address, which is used as a destination address in a packet of PCI (Peripheral Component Interconnect) Express bus. In this case, the destination address region of a packet may be used as the element of a packet destination address in the encapsulation table 25, and an encapsulated address may be associated with the destination address region.

The packet encapsulation unit 24 receives one or more packets of a same destination, which are extracted by the packet extraction unit 22 by one-time operation, and retrieves an address for use in encapsulation, while using the packet destinations received from the packet extraction unit 22 as a retrieve key, by referring to the encapsulation table 25. Further, the packet encapsulation unit 24 encapsulates one or more packets received from the packet extraction unit 22 into a packet by one-time operation, with use of a retrieved address for encapsulation, and transfers the encapsulated packet to the re-transmission congestion control unit 26.

The re-transmission congestion control unit 26 transmits a packet received from the packet encapsulation unit 24 to the network 3, while adjusting the transmission speed in such a manner that congestion does not occur in the network 3. In view of the above, the re-transmission congestion control unit 26 performs a control of transmitting packets for each destination to be connected to the network 3. The re-transmission congestion control unit 26 notifies the rate setting unit 23 of all or a part of information of a packet transmission speed for each destination, a total value of the packet transmission speeds, and a physical band in a network link to be connected to the network 3. Further, when a packet transmitted to the network 3 does not reach a destination due to congestion or bit error in the network 3, the re-transmission congestion control unit 26 transmits the packet again. Further, the re-transmission congestion control unit 26 transfers a packet obtained by encapsulating a plurality of packets received from the network 3 to the packet decapsulation unit 27.

The trade-off parameter setting unit 28 provides an interface for setting a parameter (in the following, the parameter is referred to as γ), which is used for calculating an optimum aggregation number depending on a trade-off relationship between band improvement and an increase in delay by packet aggregation and encapsulation.

The parameter γ is a real number representing a relative significance between gain by band improvement, and loss by an increase in delay, and is a value from a negative infinity to a positive infinity. A user or administrator of the system sets the parameter γ with use of the trade-off parameter setting unit 28.

The maximum aggregation number calculation unit 29 calculates an optimum value of the maximum packet number by which packets are aggregated and encapsulated into a packet with use of the parameter γ given from the trade-off parameter setting unit 28, and sets the calculated value in the packet extraction unit 22. In this example, the maximum packet number may be set by using the number of packets, or may be set by using the total size of packets that are aggregated. The maximum aggregation number calculation unit 29 obtains an optimum value by obtaining n that maximizes a calculation result of the following optimization formula 1.

[Expression 1]

$$\frac{1 - \frac{1}{n}}{1 + \frac{O}{n}} - \gamma(n-1) \qquad \text{Optimization formula 1}$$

In the optimization formula 1, n denotes the maximum packet number by which packets are aggregated into a packet, O denotes an overhead when packets are individually encapsulated, and γ denotes a parameter given from the trade-off parameter setting unit 28. In this example, an overhead means the length of data to be added to a packet for encapsulation.

The first term of the optimization formula 1 denotes an improvement rate of a band by packet aggregation and encapsulation. Further, the second term denotes a rate of increase in delay. The rate of increase in delay is proportional to the number of packets to be aggregated. This is because the packet extraction unit 22 extracts packets from the packet aggregation que 21 by a round robin method for each destination, and accordingly, the time interval until a transmission opportunity is given to packets of individual destinations increases in proportion to the number of packets to be extracted from a que of each destination by one-time operation.

The optimization formula 1 yields an integrated gain by setting a rate of increase in a band as an element of gain, setting a rate of increase in delay as an element of loss, and calculating a linear sum of the two elements with use of the parameter γ as a coefficient that expresses balance of contribution between the two elements. In view of the above, the maximum packet number n by which the packet extraction unit 22 extracts packets by one-time processing is obtained by obtaining n that maximizes the optimization formula 1 representing the gain. In this example, the maximum aggregation number calculation unit 29 may obtain n that maximizes a calculation result of the optimization formula 1 by actually performing a calculation with use of the given parameter γ. In addition to the above, it is also possible to use a method, in which a table describing n that maximizes a calculation result of the optimization formula 1 is held in association with the value of O and the value of γ in advance, and the optimum value n is obtained by referring to the table. Note that in this example, the number of packets to be extracted by the packet extraction unit 22 by one-time processing is set as n that maximizes a calculation result of the optimization formula 1 (an integrated gain). Alternatively, the maximum number of packets to be extracted by the packet extraction unit 22 by one-time operation may be a value other than the value that maximizes a calculation result of the optimization formula 1 (an integrated gain), but may be set to a number smaller than n and such that the integrated gain is equal to or larger than a predetermined value. This is because there is a case, in which an integrated gain is not necessarily maximized depending on the purpose of use.

Further, in this example, when γ is positive, an integrated gain is obtained by calculating a sum of the two elements. When γ is negative, however, an integrated gain is obtained by calculating a difference between the two elements.

Alternatively, the maximum packet number may be obtained with use of the following optimization formula 2, in place of the optimization formula 1. N is the number of destinations, with which the packet aggregation device A2-A performs communication. The reason why N is multiplied in the second term is because a delay, with which a packet of a destination determined by a round robin method obtains a transmission opportunity, increases in proportion to the number of destinations.

[Expression 2]

$$\frac{1 - \frac{1}{n}}{1 + \frac{O}{n}} - \gamma N(n-1) \qquad \text{Optimization formula 2}$$

Figure 7:
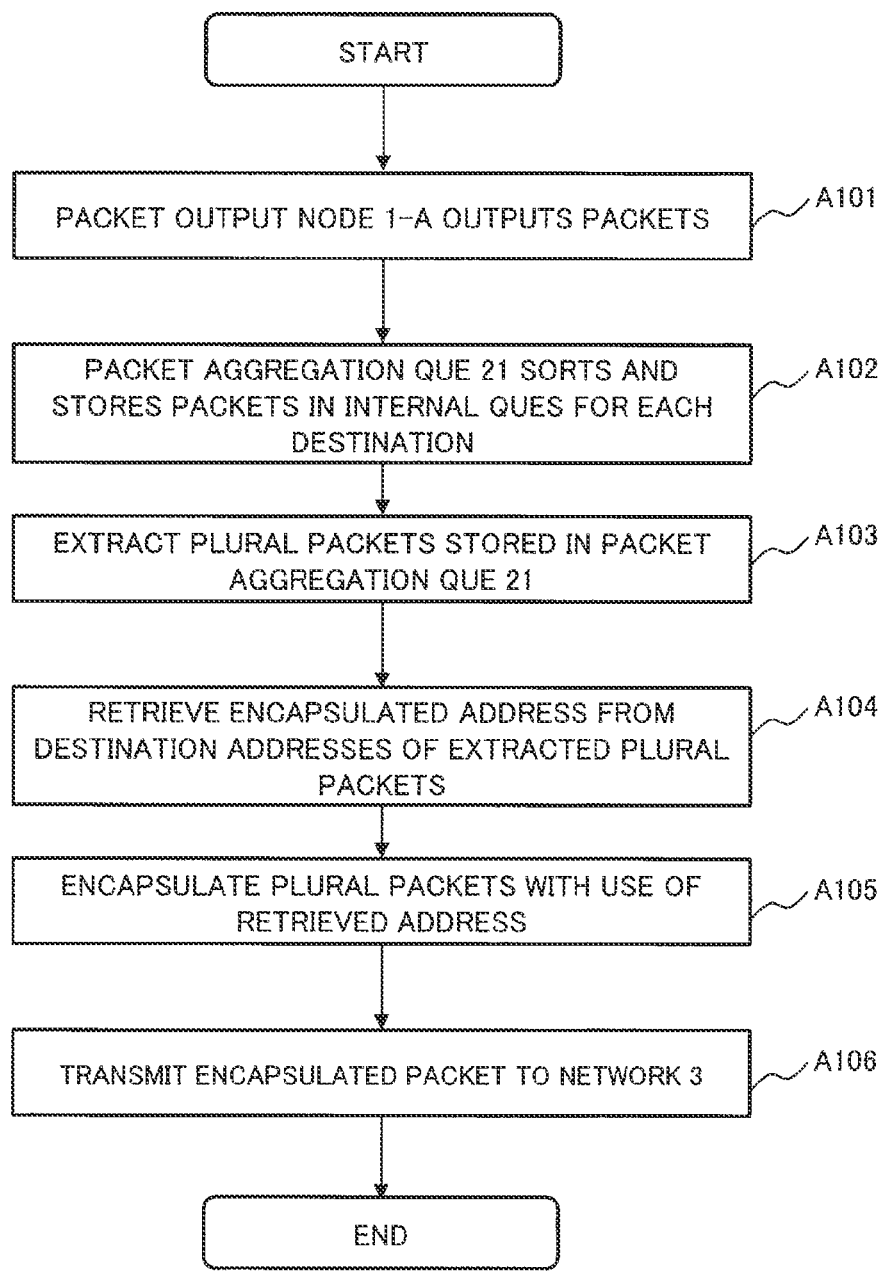
FIG. 7 is a flowchart illustrating an operation of the first exemplary embodiment of the present invention.

Next, an operation of an exemplary embodiment of the present invention is described referring to the drawings. First of all, an operation of transmitting packets to the network 3 by the packet output node 1-A in the exemplary embodiment of the present invention is described using FIG. 2 and FIG. 7. FIG. 7 is a flowchart illustrating an operation of transmitting packets to the network 3 by the packet output node 1-A.

Figure 8:
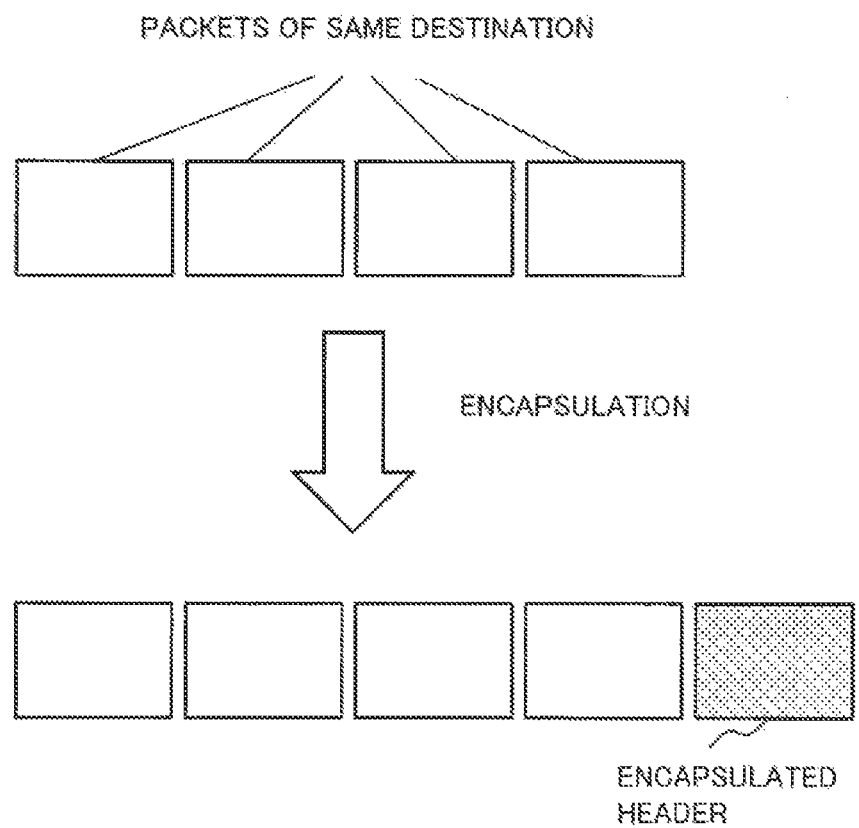
FIG. 8 is a diagram for describing the first exemplary embodiment of the present invention.

First of all, the packet output node 1-A outputs packets (Step A101). Next, the packet aggregation que 21 receives packets from the packet output node 1-A, and stores the received packets in an internal que associated with a packet output node, which serves as a destination of received packets (Step A102). Then, the packet extraction unit 22 is operated in one of the modes (A): the physical link band mode 231, (B): the congestion control band mode 232, and (C): the individual flow band mode 233. In this example, in (A): the physical link band mode 231, and in (B): the congestion control band mode 232, the packet extraction unit 22 searches an internal que of the packet aggregation que 21 at a cycle based on a round robin method, and extracts packets stored in the internal que in search and having a same destination with use of a determined maximum value as the upper limit (Step A103). In this example, the determined maximum value is a smaller value, out of the value set by the maximum aggregation number calculation unit 29, and the maximum value such that the total size of packets stored in an internal que of a same destination does not exceed the upper limit of the packet size determined in the network 3. Further, also when the system is operated in (C): the individual flow band mode 233, the packet extraction unit 22 searches an internal que of the packet aggregation que 21 at a cycle based on a round robin method. Regarding an internal que in search, the packet extraction unit 22 compares the total size of packets stored in the internal que and having a same destination, and the remaining credit written in the element corresponding to the destination of the flow-base credit buffer 221 at the point of time. When the remaining credit is equal to or larger than the total size of the stored packets, the packet extraction unit 22 extracts all the packets from the internal buffer of the packet aggregation que 21 in search. Further, the packet extraction unit 22 subtracts the credit associated with the extracted packets, from the element corresponding to the destination of the flow-base credit buffer 221. Note that when the total size of packets stored in an internal que of a same destination exceeds the determined maximum value, which is described in (A): the physical link band mode 233 and in (B): the congestion control band mode 232, the packet extraction unit 22 compares the total size of packets whose number is equal to the maximum value, and the element of the flow-base credit buffer 221; and judges whether or not packets are extracted. Then, when it is judged that packets are extracted, the packet extraction unit 22 extracts packets whose number is equal to the maximum number, and subtracts the credit associated with the extracted packets, from the element corresponding to the destination of the flow-base credit buffer 221. Next, the packet encapsulation unit 24 retrieves an encapsulated address, while using a destination address of one or more packets received from the packet extraction unit 22 as a retrieve key, by referring to the encapsulation table 24 (Step A104). Subsequently, as illustrated in FIG. 8, the packet encapsulation unit 24 encapsulates one or more packets received from the packet extraction unit 22 into a packet, with use of the address retrieved as illustrated in FIG. 8 (Step A105). In encapsulating a plurality of packets, an encapsulated header is used, and the address retrieved in Step A104 is used as the destination address of the encapsulated header. Subsequently, the re-transmission congestion control unit 26 receives packets from the packet encapsulation unit 24, and transmits the received packets to the network 3 at a transmission speed determined for each destination packet output node (Step A106).

Figure 9:
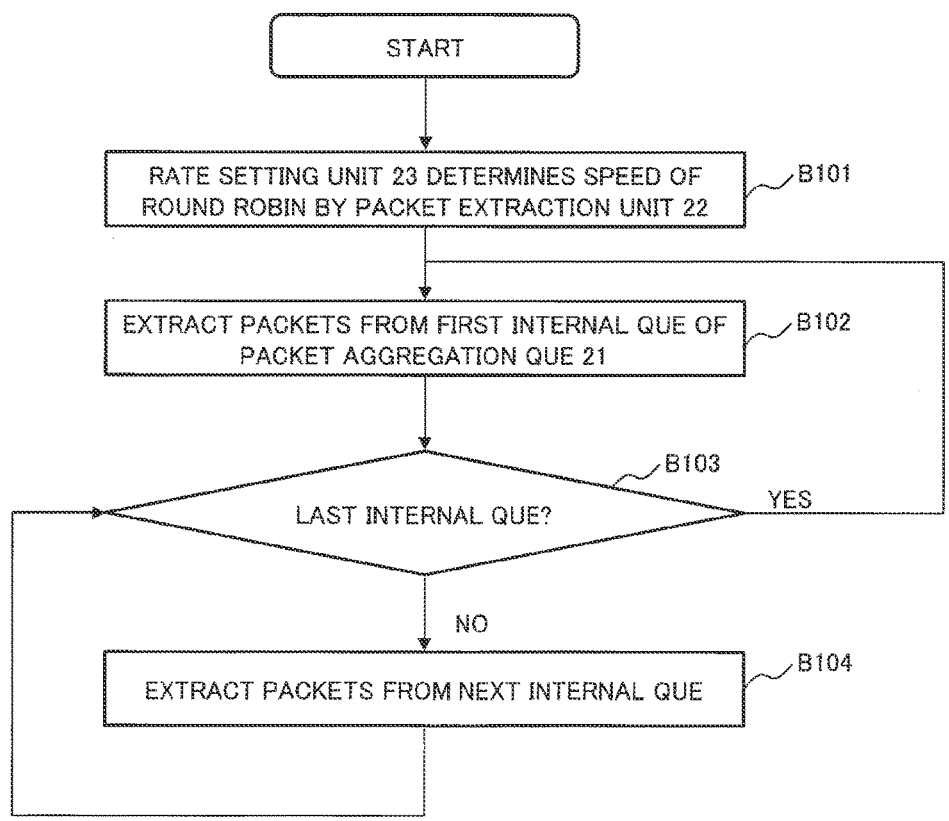
FIG. 9 is a flowchart illustrating an operation of the first exemplary embodiment of the present invention.

Next, an operation of the packet extraction unit 22 in (A): the physical link band mode 231 and in (B): the congestion control band mode 232 is described using FIG. 4 and FIG. 9. FIG. 9 is a flowchart illustrating an operation of the packet extraction unit 22 in (A): the physical link band mode 231 and in (B): the congestion control band mode 232.

First of all, the rate setting unit 23 determines an operating speed (a volume of data to be extracted/unit time) of round robin by the packet extraction unit 22 (Step B101). The speed of round robin is a smaller value, out of a band in a network link by which the re-transmission congestion control unit 26 connects with the network 3 in (A): the physical link band mode 231, and a total value of transmission speeds set for the respective destinations by the re-transmission congestion control unit 26 in (B): the congestion control band mode 232; and a band in a network link by which the re-transmission congestion control unit 26 connects with the network 3. Next, the packet extraction unit 22 extracts all the packets stored in a first internal que of the packet aggregation que 21, and transfers the extracted packets to the packet encapsulation unit by referring to the first internal que of the packet aggregation que 21 (Step B102). Note that when the number of packets stored in an internal que exceeds the maximum aggregation number, the packet extraction unit 22 extracts the maximum aggregation number of packets from the internal que. In this example, the maximum aggregation number is a smaller value, out of the value set in the maximum aggregation number calculation unit 29, and the maximum value such that the total size of packets that are aggregated does not exceed the upper limit of the packet size determined in the network 3. Next, the packet extraction unit 22 confirms whether or not the internal que from which packets are extracted is the last internal que to be held in the packet aggregation que 21 (Step B103). When it is confirmed that the internal que does not correspond to the last internal que, the packet extraction unit 22 extracts packets from a next que (Step B104). The operation of Step B104 is the same as the operation of extracting packets in Step B102. Subsequently, the process returns to Step B103, and thereafter, the packet extraction unit 22 repeats packet extraction until the last internal que to be held in the packet aggregation que 21 by repeating Step B103 and Step B104 thereafter. Further, when packet extraction reaches the last internal que, the order of packet extraction is returned to the first internal que of the packet aggregation que 21 by judging Yes at a conditional branching by Step B103 and by returning to Step B102. Thereafter, the operations of Step B102 and the steps that follow are repeated. Note that in (B): the congestion control band mode 232, it is possible to periodically update the speed of round robin operation by the packet extraction unit 22, which is determined in Step B101. In this case, a transmission speed, which is determined by the re-transmission congestion control unit 26 for each destination at the point of time, is used for calculating an updated value of the speed.

Figure 10:
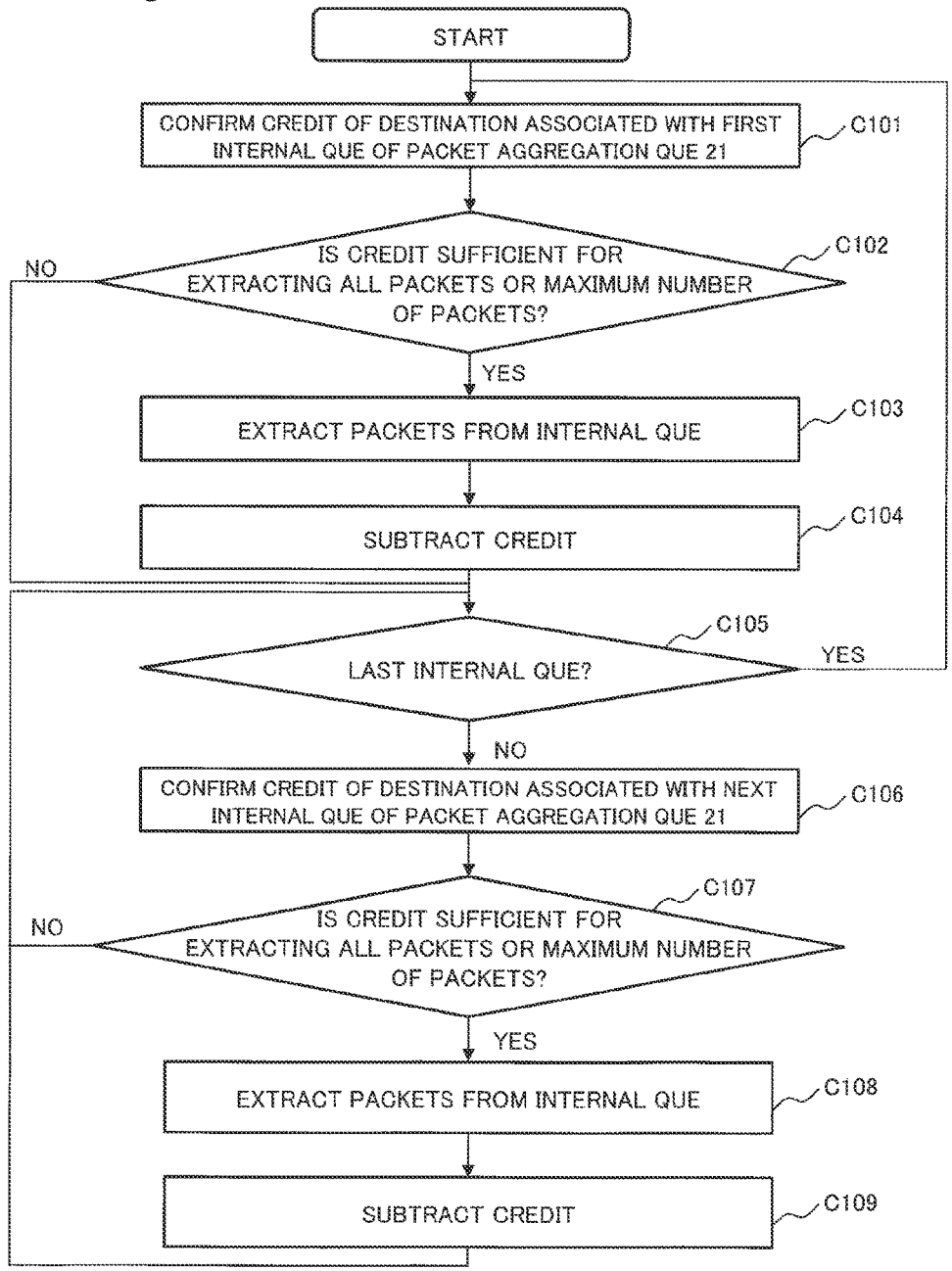
FIG. 10 is a flowchart illustrating an operation of the first exemplary embodiment of the present invention.
Figure 11:
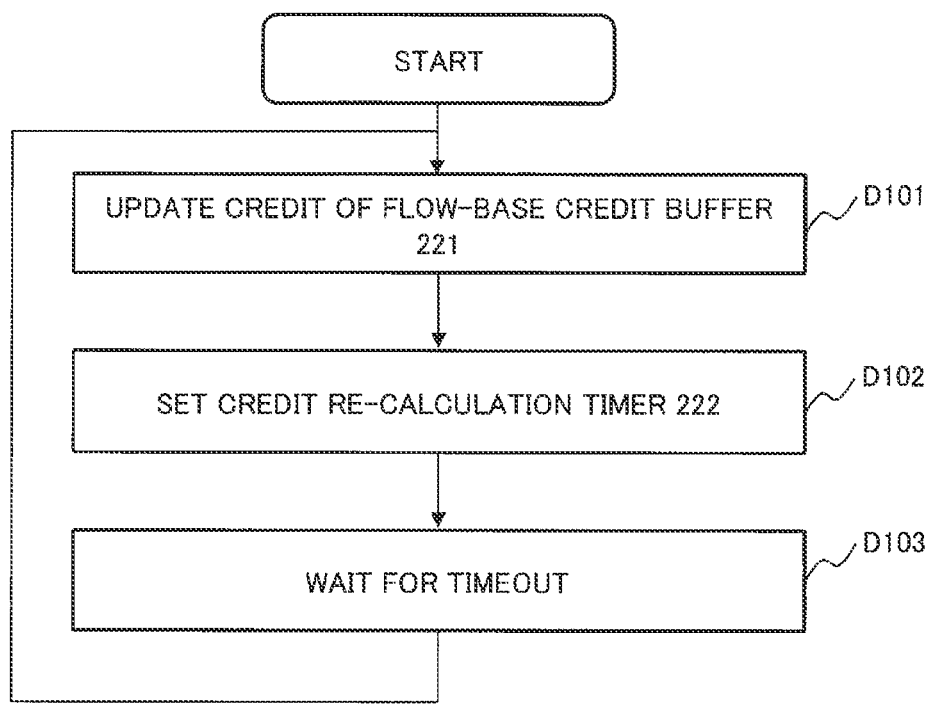
FIG. 11 is a flowchart illustrating an operation of the first exemplary embodiment of the present invention.

Next, an operation of the packet extraction unit 22 in (C): the individual flow band mode 233 is described using FIG. 5, FIG. 10, and FIG. 11. FIG. 10 is a flowchart illustrating an operation of extracting packets from the packet aggregation que 21 by the packet extraction unit 22 in (C): the individual flow band mode 233. Further, FIG. 11 is a flowchart illustrating an operation of updating a credit in the flow-base credit buffer 221 of the packet extraction unit 22.

First of all, the packet extraction unit 22 confirms the value of the remaining credit of a destination associated with the first internal que of the packet aggregation que 21 by referring to the element associated with the destination of the flow-base credit buffer 221 (Step C101). Subsequently, when the value of the confirmed credit is equal to or larger than the total size of packets stored in the first internal que of the packet aggregation que 21 (Step C102), the packet extraction unit 22 extracts all the packets from the internal que (Step C103). Then, the packet extraction unit 22 subtracts the value of the credit associated with the total size of the extracted packets, from the element associated with the destination of the flow-base credit buffer 221 (Step C104). In this example, packets to be extracted from an internal buffer of the packet aggregation que 21 by the packet extraction unit 22 may not be all the packets accumulated in the internal que, but may be determined maximum number of packets. This is the same as the operation described in Step A103. In this case, the value to be compared with the value of the credit by the packet extraction unit 22 in Step C102 is the total size of maximum number of packets, and the value of the credit to be subtracted from the element associated with the destination of the flow-base credit buffer 221 is the value of the credit associated with the total size of maximum number of packets. Subsequently, the packet extraction unit 22 confirms whether or not the internal que from which packets are extracted is the last internal que to be held in the packet aggregation que 21 (Step C105). When the internal que is not the last internal que, the packet extraction unit 22 confirms the element of the flow-base credit buffer 221, which is associated with the destination of a next internal que (Step C106). Next, when the value of the confirmed credit is equal to or larger than the total size of packets stored in the internal que of the destination associated with the confirmed credit in the packet aggregation que 21 (Step C107), the packet extraction unit 22 extracts all the packets from the internal que (Step C108). Then, the value of the credit associated with the total size of the extracted packets is subtracted from the element associated with the destination of the flow-base credit buffer 221 (Step C109). In this example, when the number of packets stored in the aggregation que 21 exceeds the determined maximum packet number, the operation such that the number of packets to be extracted by the packet extraction unit 22 is the maximum packet number is the same as the operation of Step C103. The operation such that the credit to be subtracted is the value associated with the maximum packet number is the same as the operation of Step C104. Subsequently, the packet extraction unit 22 repeats the operations from Step C105 to Step C109 until the internal que reaches the last internal que to be held in the packet aggregation que 21. Then, after the internal que reaches the last internal que, the packet extraction unit 22 returns to the first internal que to be held in the packet aggregation que 21 (Step C105). Thereafter, the operations from Step C101 to Step C109 are repeated.

Further, the packet extraction unit 22 performs an operation of periodically updating the flow-base credit buffer 221 concurrently with an operation of transmitting packets received from the packet output node 1-A to the network 3 by the operations of Step C101 to Step C109. The packet extraction unit 22 receives a transmission speed set by the re-transmission congestion control unit 26 for each destination node from the rate setting unit 23, and updates the flow-base credit buffer 221 with use of a value of the credit, which depends on the transmission speed of each destination (Step D101). Next, the packet extraction unit 22 sets the credit re-calculation timer 222 to a predetermined value (Step D102). Subsequently, the packet extraction unit 22 waits for timeout of the credit re-calculation timer 222 (Step D103), and returns to Step D101 after the timer times out. In the subsequent operation of Step D101, the re-transmission congestion control unit 26 receives a new transmission speed set for each destination from the rate setting unit 23 at the point of time, and uses the value of the speed for credit calculation.

Figure 12:
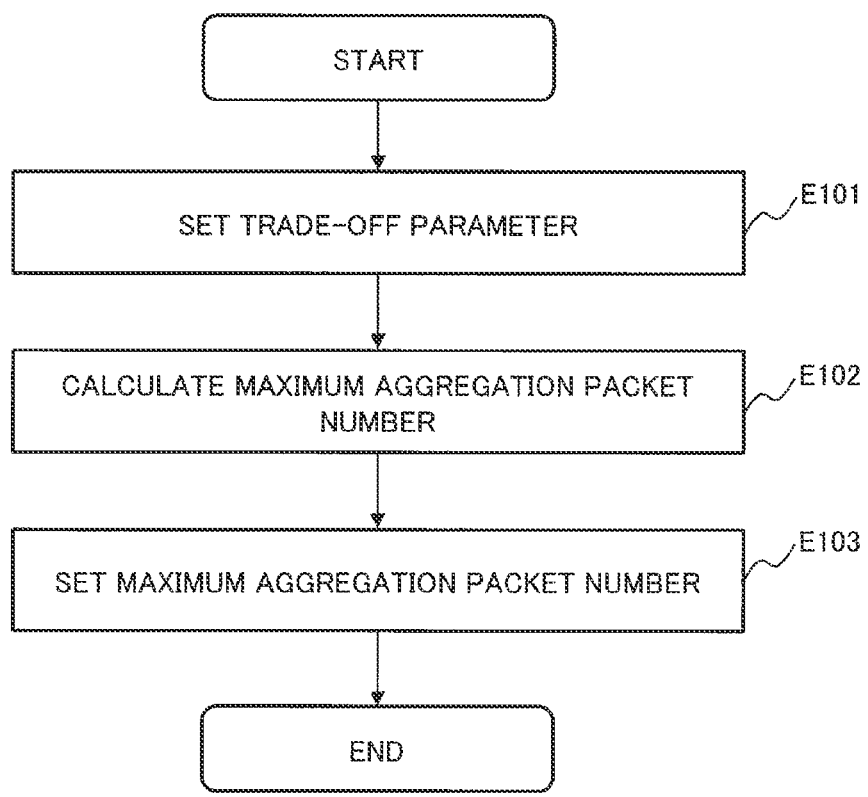
FIG. 12 is a flowchart illustrating an operation of the first exemplary embodiment of the present invention.

Next, an operation of setting the maximum packet number of packets to be aggregated by the packet extraction unit 22 is described using FIG. 2 and FIG. 12. FIG. 12 is a flowchart illustrating an operation of setting the maximum packet number of packets to be aggregated by the packet extraction unit 22 by the maximum aggregation number calculation unit 29.

The trade-off parameter setting unit 28 accepts an input of the parameter γ for use in calculating an optimum maximum aggregation packet number depending on a trade-off relationship between an increase in a band and an increase in delay by packet aggregation (Step E101). Setting the input parameter γ is performed by a user or administrator of the system. The maximum aggregation number calculation unit 29 obtains n (where n is an integer) that maximizes the optimization formula 1, as a maximum aggregation number, with use of the parameter γ received from the trade-off parameter setting unit 28 (Step E102). Subsequently, the maximum aggregation number calculation unit 29 sets the obtained maximum packet aggregation number in the packet extraction unit 22 (Step E103).

In the exemplary embodiment of the present invention, the packet extraction unit extracts all the packets with use of the packet number set by the maximum aggregation number calculation unit as the upper limit, and encapsulates the extracted packets for transmission to a network. Employing the aforementioned configuration makes it possible to reduce the overhead of a network band due to an encapsulated header, and to transmit packets in a broad band by aggregating and encapsulating a plurality of packets for transmission to a network, as compared with a configuration, in which packets are individually encapsulated for transmission to a network. Further, concurrently with the aforementioned operation, setting the maximum packet number of packets to be aggregated makes it possible to prevent an increase in transmission delay of packets by packet aggregation, and to transmit packets with a low delay.

Figure 13:
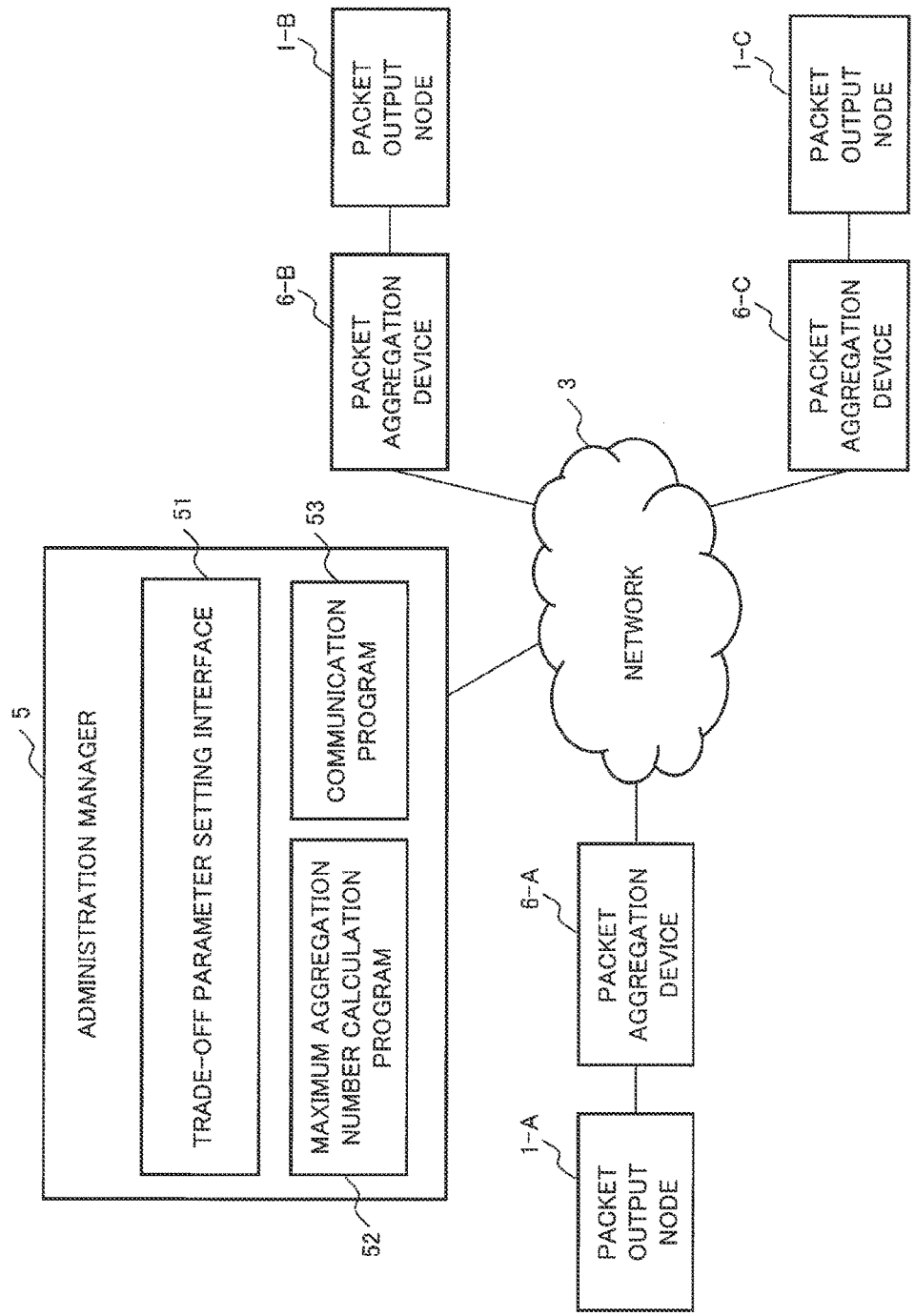
FIG. 13 is a block diagram illustrating a configuration of a packet transmission system of a second exemplary embodiment of the present invention.
Figure 14:
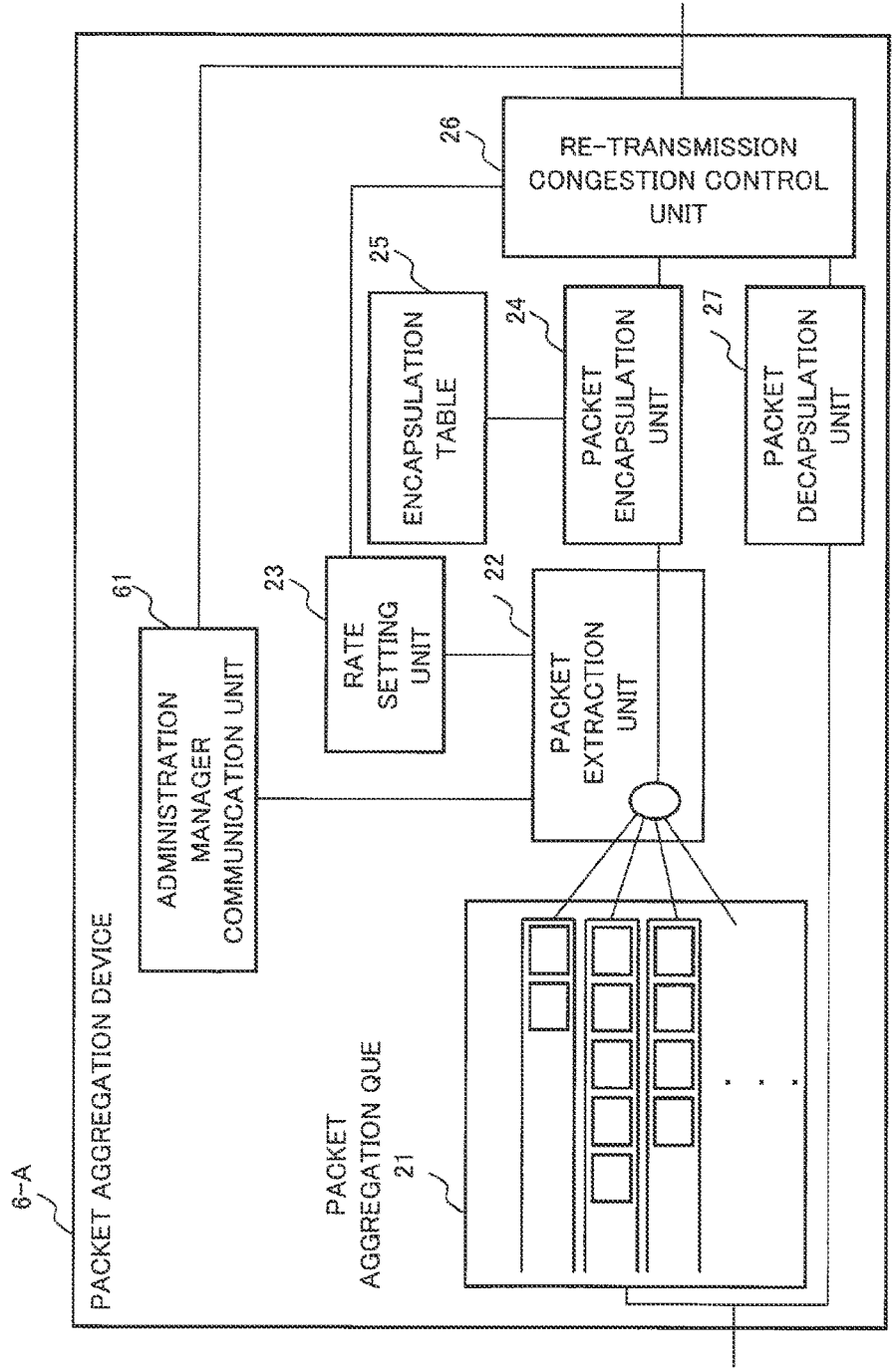
FIG. 14 is a block diagram illustrating a configuration of a packet transmission apparatus of the second exemplary embodiment of the present invention.
Figure 15:
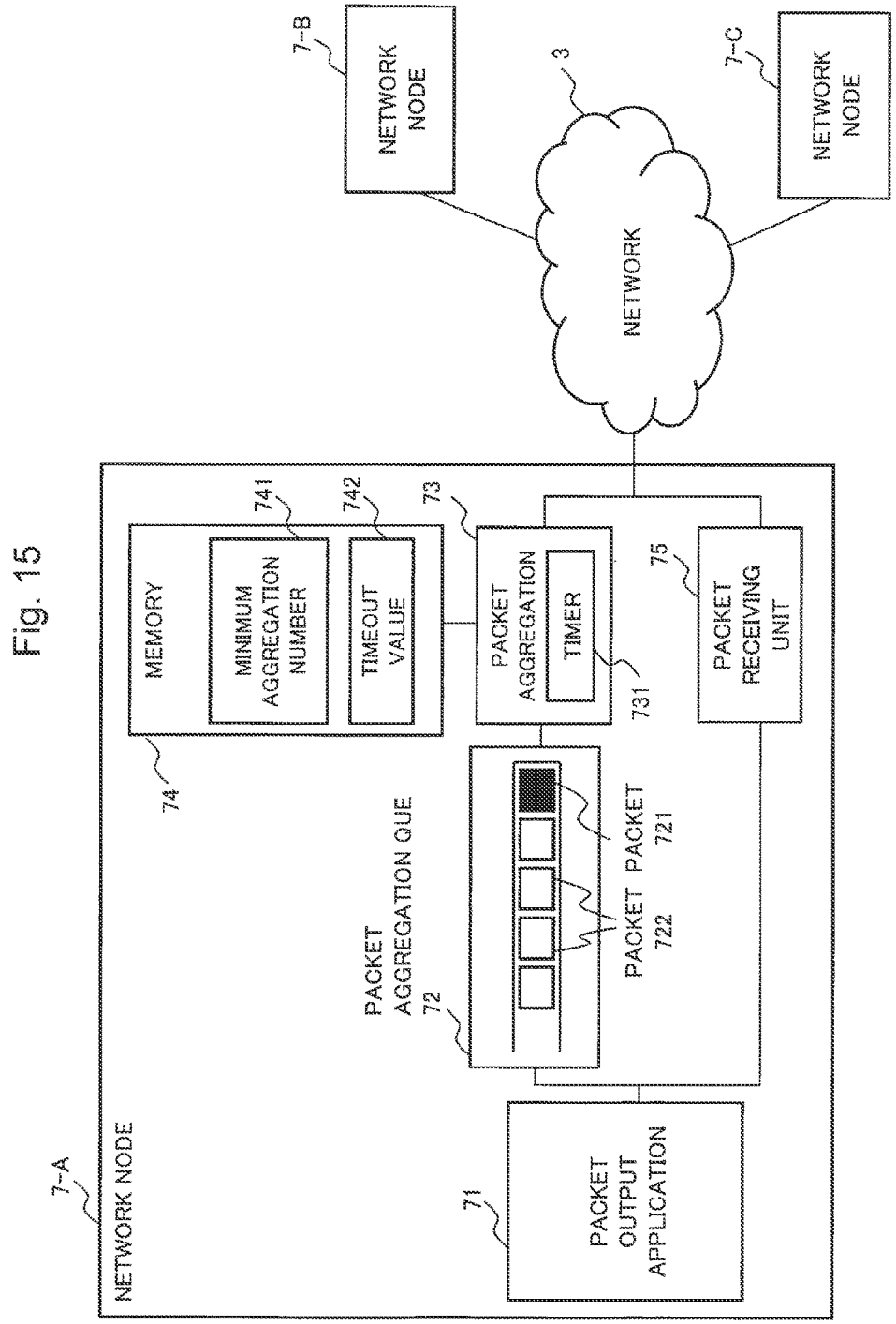
FIG. 15 is a block diagram illustrating a configuration of a conventional art.
Figure 16:
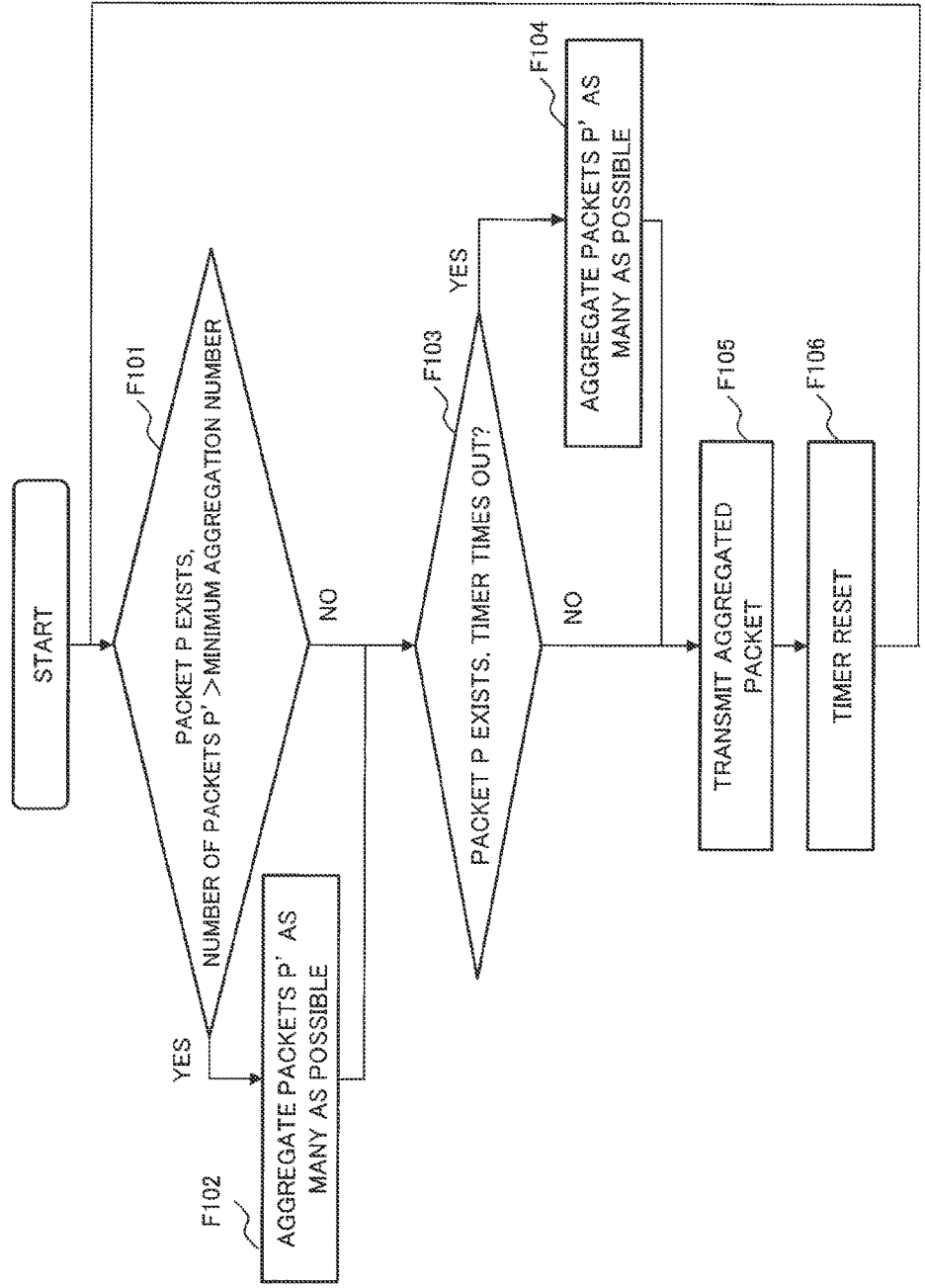
FIG. 16 is a flowchart illustrating an operation of the conventional art.

Next, a second exemplary embodiment for implementing the present invention is described using FIG. 13 and FIG. 14. FIG. 13 is a diagram illustrating a configuration of a packet transmission system of the present exemplary embodiment, and FIG. 14 is a diagram illustrating a configuration of a packet aggregation device 6-A.

Referring to FIG. 13 and FIG. 14, the packet aggregation device 6-A includes an administration manager communication unit 61 which communicates with an administration manager, in place of the trade-off parameter setting unit 28 and the maximum aggregation number calculation unit 29 to be held in the packet aggregation device 2-A illustrated in FIG. 2. The administration manager communication unit 61 sets a maximum packet aggregation number received from an administration manager 5 in a packet extraction unit 22, as the maximum packet number by which the packet extraction unit 22 extracts packets from a packet aggregation que by one-time processing. The packet aggregation device 6-A corresponds to a bridge means, and the administration manager 5 corresponds to an administration means.

Further, the configuration of a packet aggregation device 6-B and the configuration of a packet aggregation device 6-C are the same as the configuration of the aggregation device 6-A, and each of the packet aggregation device 6-B and the packet aggregation device 6-C constitutes a bridge means. Further, the number of sets of packet output nodes and packet aggregation devices is not limited to three, which is the same as in the first exemplary embodiment.

The administration manager 5 includes a trade-off parameter setting interface 51 which accepts setting of a parameter γ for use in calculating an optimum maximum packet aggregation number from a trade-off between an increase in a communication band and an increase in delay by packet aggregation from a user or administrator of the system; a maximum aggregation number calculation program 52 which obtains n (where n is an integer) that maximizes the optimization formula 1 as a maximum aggregation number with use of the set parameter γ; and a communication program 53 which notifies the obtained maximum packet aggregation number to all the packet aggregation devices with use of a network 3. The communication program 53 corresponds to a transmission means.

By employing the aforementioned configuration, an optimum maximum packet aggregation number is collectively calculated by the administration manager, and is transmitted to each of the packet aggregation devices with use of a network for setting a maximum packet aggregation number of the packet aggregation devices. According to the aforementioned configuration, administrating integrally the maximum packet aggregation number within the system is easily performed, and the circuit of the packet aggregation device by executing calculation of the optimization formula 1, whose mounting in terms of hardware is complicated because division is included, with software by an administration manager, is simplified.

In the foregoing description, each of the exemplary embodiments of the present invention is described. The packet extraction unit 22, the rate setting unit 23, the encapsulation unit 24, the packet decapsulation unit 27, the trade-off parameter unit 28, and the maximum aggregation number calculation unit 29 of a packet aggregation device, which are illustrated in FIG. 2, FIG. 5, and FIG. 14, may be constituted by hardware components or may be constituted by software components. A part or all of the functions of each of the units may also be implemented by causing a computer to read a program that implements the functions from a computer-readable recording medium such as a CD-ROM (Compact Disc Read Only Memory), a DVD (Digital Versatile Disc), or a flash memory for execution.

For instance, a computer as a packet aggregation device may be constituted by a storage unit in which a program is stored, such as a hard disk or an ROM (Read Only Memory), a display unit such as a liquid crystal display, a DRAM (Dynamic Random Access Memory) which stores data necessary for calculation, a CPU (Central Processing Unit), and a bus for connecting the units. Describing an operation of each of the units illustrated in FIG. 2, FIG. 5, and FIG. 14 in a program, storing the program in a storage unit such as an ROM, storing information necessary for calculation in a DRAM, and operating the program by a CPU makes it possible to implement the functions of the packet aggregation device according to the present exemplary embodiment by the program.

Further, the present invention is not limited to the aforementioned exemplary embodiments. It is needless to say that various modifications are applicable as far as the modifications do not depart from the gist of the present invention described above.

The whole or part of the exemplary embodiments disclosed above can be described as, but not limited to, the following supplementary notes.

(Supplementary Note 1)

A packet transmission apparatus comprising:
storage means which sorts and stores packets in accordance with each destination;
extraction means which extracts a plurality of packets stored in the storage means for each destination by one-time operation; and
maximum packet number setting means which sets a maximum number of packets to be extracted by the extraction means by one-time operation, wherein the maximum packet number setting means sets the maximum number of packets in such a manner that an integrated gain representing an increase in band by aggregation of extracted packets, and a transmission delay by the packet aggregation is equal to or larger than a predetermined value.

(Supplementary Note 2)

The packet transmission apparatus according to Supplementary note 1, further comprising:
parameter input means which inputs a parameter for use in calculating the maximum number of packets by the maximum packet number setting means, to the maximum packet number setting means, wherein
the maximum packet number setting means
sets a sum of a first term and a second term, or a difference between the first term and the second term as an integrated gain, with use of the parameter input from the parameter input means as a coefficient that gives a relative magnitude between the first term and the second term, the first term including a maximum packet number and giving an increase in band by packet aggregation, the second term including the maximum packet number and giving an increase in transmission delay by packet aggregation;
determines the maximum packet number in such a manner that the integrated gain is maximized; and
sets the determined maximum packet number as the maximum number of packets.

(Supplementary Note 3)

The packet transmission apparatus according to Supplementary note 2, wherein
the second term is proportional to the maximum packet number.

(Supplementary Note 4)

The packet transmission apparatus according to any one of Supplementary notes 1 to 3, further comprising:
address storage means which holds an address for use in aggregating and encapsulating packets extracted by the extraction means by one-time operation; and
packet encapsulation means which retrieves an address for use in encapsulation from the address storage means, and aggregates and encapsulates a plurality of packets extracted by the extraction means.

(Supplementary Note 5)

A packet transmission system comprising:
bridge means which aggregates packets for transmission;
administration means which administrates the bridge means; and
a network which connects between the bridge means and the administration means,
the bridge means including:
storage means which sorts and stores packets in accordance with each destination;
extraction means which extracts a plurality of packets stored in the storage means for each destination by one-time operation;
address storage means which holds an address for use in encapsulating packets extracted by the extraction means; and
packet encapsulation means which retrieves an address for use in encapsulation from the address storage means, and aggregates and encapsulates a plurality of packets extracted by the extraction means, and
the administration means including:
maximum packet number calculation means which calculates a maximum number of packets to be extracted by the extraction means by one-time operation;

parameter input means which inputs a parameter for use in calculating a maximum number of packets by the maximum packet number calculation means; and transmission means which transmits a maximum number of packets calculated by the maximum packet number calculation means, to the bridge means.

(Supplementary Note 6)

A packet transmission method for use in a packet transmission apparatus, the packet transmission method comprising:

sorting and storing packets in accordance with each destination;

extracting a plurality of the stored packets for each destination by one-time operation;

performing the plural extraction, based on a maximum number of packets to be extracted by one-time operation; and determining the maximum number of packets in such a manner that an integrated gain representing an increase in band by aggregation of extracted packets, and a transmission delay by the packet aggregation is equal to or larger than a predetermined value.

(Supplementary Note 7)

The packet transmission method according to Supplementary note 6, wherein the maximum number of packets is calculated with use of a parameter that gives the maximum number of packets to be extracted by one-time operation, a sum of a first term and a second term, or a difference between the first term and the second term is set as an integrated gain, with use of the parameter as a coefficient that gives a relative magnitude between the first term and the second term, the first term including a maximum packet number and giving an increase in band by packet aggregation, the second term including the maximum packet number and giving an increase in transmission delay by packet aggregation, the maximum packet number is determined in such a manner that the integrated gain is maximized, and the determined maximum packet number is set as the maximum number of packets.

(Supplementary Note 8)

The packet transmission method according to Supplementary note 7, wherein the second term is proportional to the maximum packet number.

(Supplementary Note 9)

The packet transmission method according to any one of Supplementary notes 6 to 8, wherein an address for use in encapsulating the extracted packets is held in address storage means, and an address for use in encapsulation is retrieved from the address storage means, and a plurality of the extracted packets are aggregated and encapsulated.

(Supplementary Note 10)

A packet transmission method for use in a packet transmission apparatus including bridge means which aggregates packets for transmission, administration means which administrates the bridge means, and a network which connects between the bridge means and the administration means, wherein the bridge means sorts and stores packets in accordance with each destination, extracts a plurality of the stored packets for each destination by one-time operation, holds an address for use in encapsulating the extracted packets in address storage means, and retrieves an address for use in encapsulation from the address storage means, and aggregates and encapsulates a plurality of the extracted packets, and the administration means calculates a maximum number of packets to be extracted by the bridge means by one-time operation, accepts a parameter for use in calculating the maximum number of packets, and transmits the calculated maximum number of packets to the bridge means with use of a network.

(Supplementary Note 11)

A program for use in packet transmission, the program causing a computer as a packet transmission apparatus to execute:

a process of sorting and storing packets according to each destination;

a process of extracting a plurality of stored packets for each destination by one-time operation; and a process of setting a maximum number of packets to be extracted by one-time operation, wherein the maximum number of packets is determined in such a manner that an integrated gain representing an increase in a band by aggregation of extracted packets, and a transmission delay by the packet aggregation is equal to or larger than a predetermined value.

(Supplementary Note 12)

The program for use in packet transmission according to Supplementary note 11, wherein the maximum number of packets is calculated with use of a parameter that gives the maximum number of packets to be extracted by one-time operation, and a sum of a first term and a second term, or a difference between the first term and the second term is set as an integrated gain, with use of the parameter as a coefficient that gives a relative magnitude between the first term and the second term, the first term including a maximum packet number and giving an increase in a band by packet aggregation, the second term including the maximum packet number and giving an increase in transmission delay by packet aggregation, the maximum packet number is determined in such a manner that the integrated gain is maximized, and the determined maximum packet number is set as the maximum number of packets.

(Supplementary Note 13)

The program for use in packet transmission according to Supplementary note 12, wherein the second term is proportional to the maximum packet number.

(Supplementary Note 14)

The program for use in packet transmission according to any one of Supplementary notes 11 to 13, wherein an address for use in encapsulating the extracted packets is held in an address storage means, and an address for use in encapsulation is retrieved from the address storage means, and a plurality of the extracted packets are aggregated and encapsulated.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-097918, filed on May 9, 2014, the disclosure of which is incorporated herein in its entirety by reference.

INDUSTRIAL APPLICABILITY

The present invention is applicable to a configuration, in which packets are transmitted in a broad band and with a low delay between nodes which communicate with each other through a network. Further, the present invention is applicable to a configuration, in which I/O packets are transmitted in a broad band and with a low delay in a bus system which connects a computer and I/O devices with use of a network.

REFERENCE SIGNS LIST

1-A to 1-C Packet output node
2-A to 2-C Packet aggregation device
3 Network
5 Administration manager
6-A to 6-C Packet aggregation device
7-A to 7-C Network node
21 Packet aggregation que
22 Packet extraction unit
23 Rate setting unit
24 Packet encapsulation unit
25 Encapsulation table
26 Re-transmission congestion control unit
27 Packet decapsulation unit
28 Trade-off parameter setting unit
29 Maximum aggregation number calculation unit
51 Trade-off parameter setting interface
52 Maximum aggregation number calculation program
53 Communication program
61 Administration manager communication unit
71 Packet output application
72 Packet aggregation que
73 Packet aggregation unit
74 Memory
75 Packet receiving unit

The invention claimed is:

1. A packet transmission apparatus comprising:
a storage configured to sort and store packets in accordance with each destination; and
at least one processor configured to execute:
an extraction unit which extracts a plurality of packets stored in the storage for each destination by one-time operation; and
a maximum packet number setting unit which sets a maximum number of packets to be extracted by the extraction unit by one-time operation,
wherein the maximum packet number setting unit sets the maximum number of packets in such a manner that an integrated gain representing an increase in band by aggregation of extracted packets, and a transmission delay by the packet aggregation is equal to or larger than a predetermined value.

2. The packet transmission apparatus according to claim 1, wherein the at least one processor is further configured to execute:
a parameter input unit which inputs a parameter for use in calculating the maximum number of packets by the maximum packet number setting unit, to the maximum packet number setting unit,
wherein the maximum packet number setting unit:
sets a sum of a first term and a second term, or a difference between the first term and the second term as the integrated gain, with use of the parameter input from the parameter input unit as a coefficient that gives a relative magnitude between the first term and the second term, the first term including a maximum packet number and giving an increase in band by packet aggregation, the second term including the maximum packet number and giving an increase in transmission delay by packet aggregation;
determines the maximum packet number in such a manner that the integrated gain is maximized; and
sets the determined maximum packet number as the maximum number of packets.

3. The packet transmission apparatus according to claim 2, wherein the second term is proportional to the maximum packet number.

4. The packet transmission apparatus according to claim 1, further comprising:
an address storage configured to hold an address for use in aggregating and encapsulating packets extracted by the extraction unit by one-time operation,
wherein the at least one processor is further configured to execute a packet encapsulation unit which retrieves an address for use in encapsulation from the address storage, and aggregates and encapsulates a plurality of packets extracted by the extraction unit.

5. A packet transmission system comprising:
a bridge configured to aggregate packets for transmission; and
a first processor configured to execute an administration unit which is connected to the bridge via a network and administrates the bridge,
the bridge including:
a storage configured to sort and store packets in accordance with each destination;
a second processor configured to execute an extraction unit which extracts a plurality of packets stored in the storage for each destination by one-time operation; and
an address storage configured to hold an address for use in encapsulating packets extracted by the extraction unit;
wherein the second processor is further configured to execute a packet encapsulation unit which retrieves an address for use in encapsulation from the address storage, and aggregates and encapsulates a plurality of packets extracted by the extraction unit, and
the administration unit including:
a maximum packet number calculation unit which calculates a maximum number of packets to be extracted by the extraction unit by one-time operation;
a parameter input unit which inputs a parameter for use in calculating a maximum number of packets by the maximum packet number calculation unit; and
a transmission unit which transmits a maximum number of packets calculated by the maximum packet number calculation unit, to the bridge.

6. A packet transmission method for use in a packet transmission apparatus, the packet transmission method comprising:
sorting and storing packets in accordance with each destination;
extracting a plurality of the stored packets for each destination by one-time operation;

performing the plural extraction, based on a maximum number of packets to be extracted by one-time operation; and determining the maximum number of packets in such a manner that an integrated gain representing an increase in band by aggregation of extracted packets, and a transmission delay by the packet aggregation is equal to or larger than a predetermined value.

7. The packet transmission method according to claim 6, wherein the maximum number of packets is calculated with use of a parameter that gives the maximum number of packets to be extracted by one-time operation, wherein a sum of a first term and a second term, or a difference between the first term and the second term is set as the integrated gain, with use of the parameter as a coefficient that gives a relative magnitude between the first term and the second term, the first term including a maximum packet number and giving an increase in band by packet aggregation, the second term including the maximum packet number and giving an increase in transmission delay by packet aggregation, wherein the maximum packet number is determined in such a manner that the integrated gain is maximized, and wherein the determined maximum packet number is set as the maximum number of packets.

8. The packet transmission method according to claim 7, wherein the second term is proportional to the maximum packet number.

9. The packet transmission method according to claim 6, wherein an address for use in encapsulating the extracted packets is held in an address storage, and wherein an address for use in encapsulation is retrieved from the address storage, and a plurality of the extracted packets are aggregated and encapsulated.

* * * * *